(12) United States Patent
Shim

(10) Patent No.: US 7,311,634 B2
(45) Date of Patent: Dec. 25, 2007

(54) SEVEN-SPEED POWERTRAIN OF AN AUTOMATIC TRANSMISSION FOR VEHICLES

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 11/236,988

(22) Filed: Sep. 28, 2005

(65) Prior Publication Data

US 2007/0072730 A1 Mar. 29, 2007

(51) Int. Cl.
*F16H 3/62* (2006.01)
(52) U.S. Cl. ..................................... 475/275
(58) Field of Classification Search ........ 475/275–279, 475/281, 283, 285, 287, 289, 291, 292, 296, 475/297, 312, 318, 324
See application file for complete search history.

(56) References Cited

U.S. PATENT DOCUMENTS

| | | | | |
|---|---|---|---|---|
| 4,537,092 A | * | 8/1985 | Morisawa | 475/66 |
| 5,078,663 A | * | 1/1992 | Meffert | 475/284 |
| 5,830,101 A | * | 11/1998 | Nishida et al. | 475/285 |
| 6,517,463 B2 | * | 2/2003 | Sugiura et al. | 475/287 |
| 6,746,359 B2 | * | 6/2004 | Kang et al. | 475/276 |
| 6,840,885 B2 | * | 1/2005 | Yi et al. | 475/276 |
| 7,198,586 B2 | * | 4/2007 | Brooks et al. | 475/280 |
| 7,211,021 B2 | * | 5/2007 | Gumpoltsberger | 475/275 |
| 2003/0224900 A1 | * | 12/2003 | Sugiura et al. | 475/275 |

FOREIGN PATENT DOCUMENTS

| | | |
|---|---|---|
| DE | 10115985 A1 | 10/2002 |
| DE | 102004029952 A1 | 1/2005 |
| JP | 07-027190 | 1/1995 |

* cited by examiner

*Primary Examiner*—Roger Pang
*Assistant Examiner*—Justin K. Holmes
(74) *Attorney, Agent, or Firm*—Morgan Lewis & Bockius LLP

(57) ABSTRACT

A seven-speed powertrain of an automatic transmission includes an input shaft; an output shaft disposed in-parallel with the input shaft; a primary shift portion including a compound planetary gear set having four operational elements and a first simple planetary gear set having three operational elements; a secondary shift portion including a second simple planetary gear set having three operational elements; and a transfer gear device. The operational elements of the primary shift portion are combined by three clutches, two brakes, and one one-way clutch. The operational elements of the secondary shift portion are combined by one clutch, one brake, and one one-way clutch.

9 Claims, 4 Drawing Sheets

FIG.2

| frictional element | | primary shift portion | | | | | | secondary shift portion | | | shift ratio (example) |
|---|---|---|---|---|---|---|---|---|---|---|---|
| | | C1 | C2 | C3 | B1 | B2 | OWC1 | C4 | B3 | OWC2 | |
| shift speed | first forward speed | ● | | | ○ | | ● | | ○ | ● | 5.105 |
| | second forward speed | ● | | | | ● | | | ○ | ● | 2.955 |
| | third forward speed | ● | ● | | | | | | ○ | ● | 2.003 |
| | fourth forward speed | ● | ● | | | | | ● | | | 1.481 |
| | fifth forward speed | ● | | ● | | | | ● | | | 1.146 |
| | sixth forward speed | | ● | ● | | | | ● | | | 0.874 |
| | seventh forward speed | | | ● | | ● | | ● | | | 0.693 |
| R | | | ● | | ● | | | | ● | | 4.521 |
| N, P | | | | | | ● | | | ● | | 7.366 (1st/7th) |

SEVEN-SPEED POWERTRAIN OF AN AUTOMATIC TRANSMISSION FOR VEHICLES

BACKGROUND OF THE INVENTION (a) Field of the Invention

The present invention relates to a seven-speed powertrain of an automatic transmission for a vehicle.

(b) Description of the Related Art

Powertrains for automatic transmissions have been developed in different ways depending on the vehicle company, and whether a four-speed or five-speed powertrain is used. Also, six-speed automatic transmissions have been recently developed and adopted to some vehicles, and seven-speed automatic transmissions are also being developed.

However, while some existing seven-speed powertrains may realize seven forward speeds and one reverse speed, there can be problems in that overall length of the powertrain is long since the powertrain is formed by adding one brake to a conventional six-speed automatic transmission and all elements are arranged in a length direction on one shaft. Also problems can arise in that durability and design freedom are poor since a load acting on a planetary gear and a clutch is increased due to an increase of a shift ratio.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a seven-speed powertrain of an automatic transmission having advantages of reducing an overall length by separately disposing elements on two shafts. Embodiments of the present invention also provide a seven-speed powertrain of an automatic transmission having advantages of improving durability of planetary gear sets and enhancing freedom in a selection of shift ratios by integrally rotating a secondary shift portion at each speed, and allowing a skip shift within three shift speed steps.

An exemplary seven-speed powertrain of an automatic transmission according to an embodiment of the present invention includes: an input shaft; an output shaft disposed in parallel with the input shaft; a primary shift portion arranged on the input shaft so as to receive an input from the input shaft, and including a compound planetary gear set having a first, a second, a third, and a fourth operational element and a first simple planetary gear set having a fifth, a sixth, and a seventh operational element; a secondary shift portion arranged on the output shaft so as to transmit an output to the output shaft, and including a second simple planetary gear set having an eighth, a ninth, and a tenth operational element; and a transfer gear device connecting one of the operational elements of the primary shift portion and one of the operational elements of the secondary shift portion such that a power of the primary shift portion can be transmitted to the secondary shift portion. The first to the seventh operational elements of the primary shift portion are combined by three clutches, two brakes, and one one-way clutch, such that three operational elements of the first to the seventh operational elements act as variable input elements and two operational elements act as variable reaction elements. The eighth to the tenth operational elements of the secondary shift portion are combined by one clutch, one brake, and one one-way clutch, such that one operational element of the eighth to the tenth operational elements acts as a variable reaction element and one operational element acts as an output element.

The first simple planetary gear set of the primary shift portion may be formed by a single pinion planetary gear set, and the compound planetary gear set of the primary shift portion may be formed by a Ravingneaux type planetary gear set. The first simple planetary gear set may include a first ring gear of the fifth operational element, a first planet carrier of the sixth operational element, and a first sun gear of the seventh operational element. The compound planetary gear set may include a second sun gear of the fourth operational element, a third sun gear of the first operational element, a second ring gear of the second operational element, and a second planet carrier of the third operational element.

The fifth operational element may be fixedly connected to the input shaft so as to act as a fixed input element. The first and the fourth operational elements may be variably connected to the sixth operational element respectively via a clutch so as to act as variable input elements. The third operational element may be variably connected to the input shaft via a clutch so as to act as a variable input element. The fourth operational element may be variably connected to a transmission case via a brake so as to also act as a variable reaction element. The third operational element may be connected to the transmission case via a brake and a one-way clutch disposed in parallel so as to also act as a variable reaction element. The seventh operational element may be fixedly connected to the transmission case so as to always act as a fixed element. The second operational element may be connected to the transfer gear device so as to act as an output element of the primary shift portion.

The second simple planetary gear set of the secondary shift portion may be formed by a single pinion planetary gear set, and the second simple planetary gear set may include a third ring gear of the eighth operational element, a third planet carrier of the ninth operational element, and a fourth sun gear of the tenth operational element.

The eighth operational element may be connected to the transfer gear device so as to act as an input element of the secondary shift portion, the ninth operational element acts as an output element and may be connected to the tenth operational element via a clutch so as to be variably connected to the tenth operational element, and the tenth operational element may be connected to the transmission case via a brake and a one-way clutch disposed in parallel so as to act as a variable reaction element.

The transfer gear device may include a transfer drive gear fixedly connected to the second operational element of the primary shift portion, and a transfer driven gear engaged with the transfer drive gear and fixedly connected to the eighth operational element of the secondary shift portion.

In another embodiment of the present invention, a seven-speed powertrain for an automatic transmission includes: an input shaft and an output shaft disposed in parallel with each other; a primary shift portion arranged on the input shaft so as to receive an input from the input shaft; a secondary shift portion arranged on the output shaft so as to transmit an output to the output shaft; and a transfer gear device connecting the primary shift portion and the secondary shift portion such that a power of the primary shift portion can be transmitted to the secondary shift portion. The primary shift portion is formed by a combination of a simple planetary gear set and a compound planetary gear set, the simple planetary gear set being formed by a single pinion planetary gear set comprising a first sun gear, a first ring gear, and a first planet carrier as operational elements thereof, and the compound planetary gear set being formed by a Ravingneaux type planetary gear set comprising a second sun gear, a third sun gear, a second ring gear, and a second planet carrier as operational elements thereof. The first sun gear of the simple planetary gear set is fixedly connected to a transmission case so as to always act as a fixed element, the first ring gear is fixedly connected to the input shaft, the third sun gear and the second sun gear of the compound planetary gear set are variably connected to the first planet carrier respectively via a first clutch and a second clutch, the second planet carrier is variably connected to the input shaft via a third clutch and is also variably connected to the transmission case via a first brake, the second sun gear is variably connected to the transmission case via a second brake, and the second ring gear is connected to the transfer gear device so as to transmit an output of the primary shift portion to the secondary shift portion. The secondary shift portion is formed by a simple planetary gear set formed by a single pinion planetary gear set comprising a fourth sun gear, a third ring gear, and a third planet carrier as operational elements thereof. The third ring gear is connected to the transfer gear device so as to receive the output of the primary shift portion, the third planet carrier acts as an output element of the secondary shift portion and is connected to the fourth sun gear via a fourth clutch so as to be variably connected to the fourth sun gear, and the fourth sun gear is variably connected to the transmission case via a the third brake.

A one-way clutch for preventing a reverse rotation may be interposed between the second planet carrier and the transmission case.

A one-way clutch for preventing a reverse rotation may be interposed between the fourth sun gear and the transmission case.

BRIEF DESCRIPTION OF THE DRAWINGS

FIG. 2 is an operational chart of frictional elements of a powertrain according to the exemplary embodiment of the present invention.

DETAILED DESCRIPTION OF THE EMBODIMENTS

An exemplary embodiment of the present invention will hereinafter be described in detail with reference to the accompanying drawings.

Figure 1:
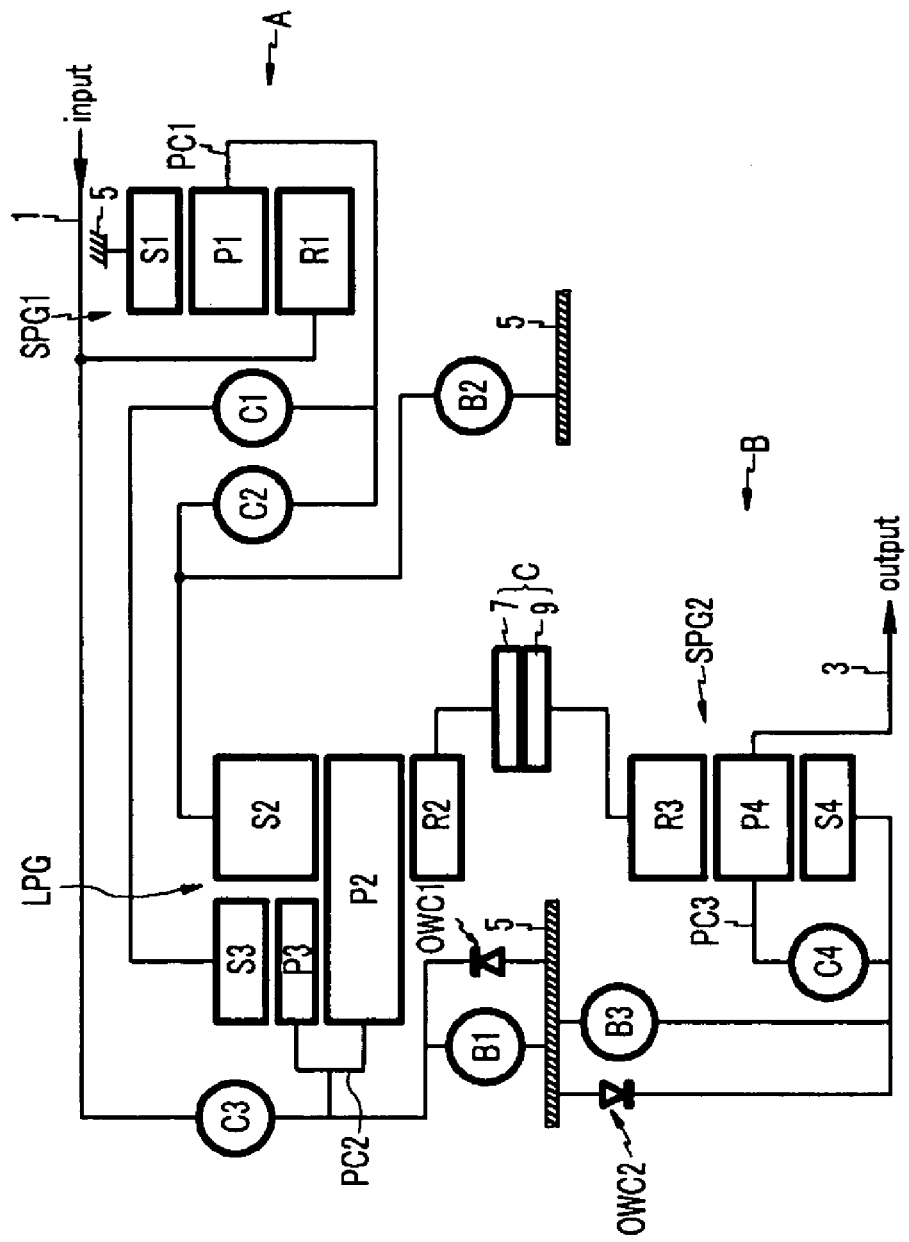
FIG. 1 is a schematic diagram of a powertrain according to an exemplary embodiment of the present invention.

As shown in FIGS. 1 and 2, a powertrain according to the exemplary embodiment of the present invention includes an input shaft 1 and an output shaft 3 disposed in parallel with each other. A primary shift portion A is arranged on the input shaft 1, and a secondary shift portion B is arranged on the output shaft 3. The primary shift portion A and the secondary shift portion B are connected to each other by a transfer gear device C. An output of the primary shift portion A is transmitted to the secondary shift portion B via the transfer gear device C.

The primary shift portion A may include one simple planetary gear set SPG1, formed by a single pinion planetary gear set, and one compound planetary gear set LPG, formed by a Ravingneaux type planetary gear set. The secondary shift portion B may include one simple planetary gear set SPG2 formed by a single pinion planetary gear set.

In addition, a powertrain according to an exemplary embodiment of the present invention further includes a plurality of frictional elements for controlling operations of the primary shift portion A and the secondary shift portion B. In an exemplary embodiment of the present invention, the plurality of frictional elements may include four clutches C1, C2, C3, and C4 and three brakes B1, B2, and B3.

The primary shift portion A formed by the combination of one simple planetary gear set SPG1 and one compound planetary gear set LPG has seven operational elements. The simple planetary gear set SPG1 includes a first sun gear S1, a first ring gear R1, and a first planet carrier PC1 rotatably supporting a first planetary gear P1 engaged with the first sun gear S1 and the first ring gear R1, as operational elements thereof. The compound planetary gear set LPG includes a second sun gear S2, a second ring gear R2, a third sun gear S3, and a second planet carrier PC2 rotatably supporting a second pinion gear P2, which is engaged with the second sun gear S2 and the second ring gear R2, and a third opinion gear P3, which is engaged with the third sun gear S3 and the second opinion gear P2, as operational elements thereof.

Hereinafter, the third sun gear S3 is set as a first operational element, the second ring gear R2 is set as a second operational element, the second planet carrier PC2 is set as a third operational element, and the second sun gear S2 is set as a fourth operational element. In addition, the first ring gear R1 is set as a fifth operational element, the first planet carrier PC1 is set as a sixth operational element, and the first sun gear S1 is set as a seventh operational element.

The first ring gear R1 of the fifth operational element is fixedly connected to an input shaft 1 so as to act as a fixed input element, and the first sun gear S1 of the seventh operational element is fixedly connected to a transmission case 5 so as to always act as a fixed element.

The third sun gear S3 of the first operational element and the second sun gear S2 of the fourth operational element are variably connected to the first planet carrier PC1 of the sixth operational element respectively via a first clutch C1 and a second clutch C2 so as to act as variable input elements.

The second planet carrier PC2 of the third operational element is variably connected to the input shaft 1 via a third clutch C3 so as to act as a variable input element. In addition, the second planet carrier PC2 is variably connected to the transmission case 5 via a first brake B1 and a first one-way clutch OWC1 so as to act a variable reaction element.

The second sun gear S2 of the fourth operational element is variably connected to the transmission case 5 via a second brake B2 so as to act as a variable reaction element. The second ring gear R2 of the second operational element is connected to the transfer gear device C so as to act as an output element of the primary shift portion A.

The transfer gear device C may include a transfer drive gear 7 connected to the primary shift portion A and a transfer driven gear 9 that is engaged with the transfer drive gear 7 and connected to the secondary shift portion B. The second ring gear R2 of the second operational element of the primary shift portion A is fixedly connected to the transfer drive gear 7.

The primary shift portion A is combined by three clutches, two brakes, and one-way clutch OWC1, so that three operational elements of the seven operational elements thereof act as variable input elements and two operational elements act as variable reaction elements.

The secondary shift portion B receiving power from the primary shift portion A is formed by one simple planetary gear set SPG2 arranged on an output shaft 3 disposed in parallel with the input shaft 1.

The simple planetary gear set SPG2 includes a fourth sun gear S4, a third ring gear R3 and a third planet carrier PC3 rotatably supporting a fourth pinion gear P4 engaged with the fourth sun gear S4 and the third ring gear R3, as operational elements thereof.

Hereinafter, the third ring gear R3 is set as an eighth operational element, the third planet carrier PC3 is set as a ninth operational element, and the fourth sun gear S4 is set as a tenth operational element.

The third ring gear R3 of the eighth operational element is fixedly connected to the transfer driven gear 9 of the transfer gear device C so as to act as an input element of the secondary shift portion B. The third planet carrier PC3 of the ninth operational element is fixedly connected to the output shaft 3 so as to always act as an output element, and at the same time, is connected to the fourth sun gear S4 via a fourth clutch C4 so as to be directly connected to the fourth sun gear S4 of the tenth operational element. The fourth sun gear S4 is connected to the transmission case 5 via a third brake B3 and a second one-way clutch OWC2 disposed in parallel, so as to act as a variable reaction element.

That is, the secondary shift portion B is combined on the output shaft 3 by one clutch, one brake, and one one-way clutch OWC2, so that one operational element of the three operational elements thereof acts as a variable reaction element and one operation element acts as an output element.

Figure 3:
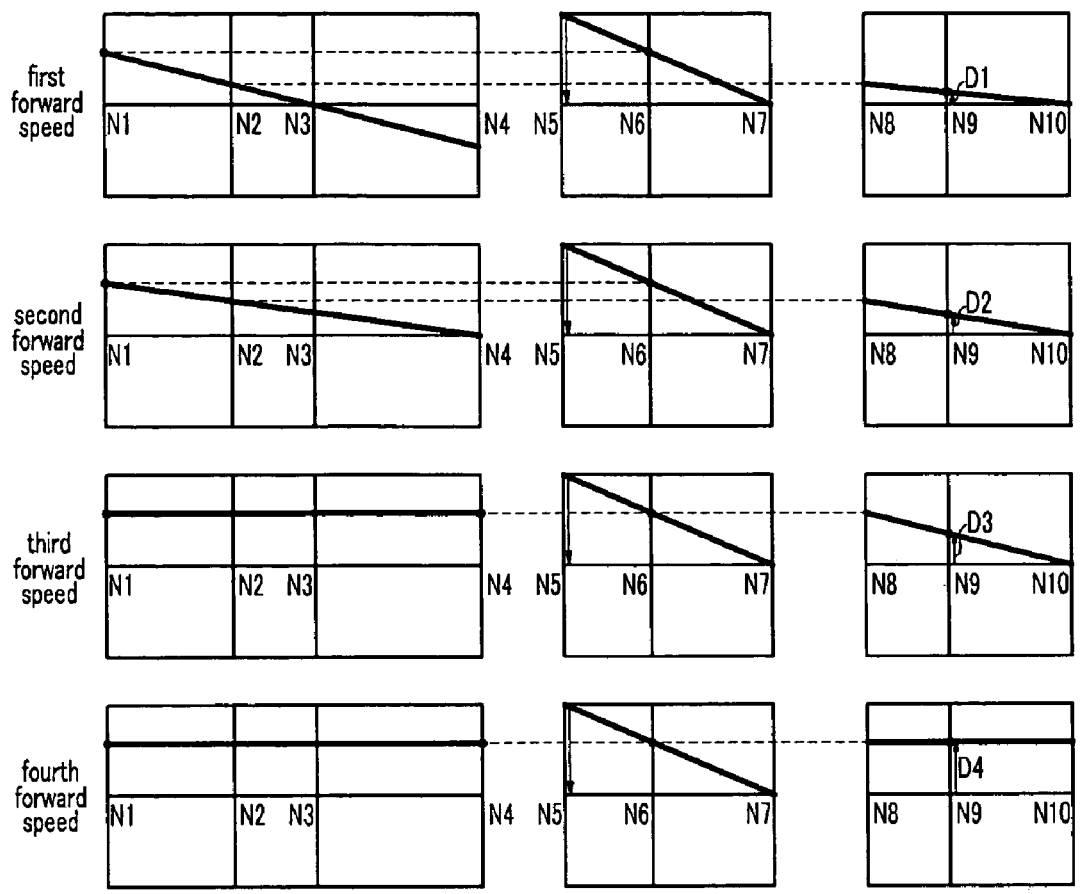
FIG. 3 is a speed diagram by lever analysis method for first through fourth forward speeds of a powertrain according to the exemplary embodiment of the present invention.
Figure 4:
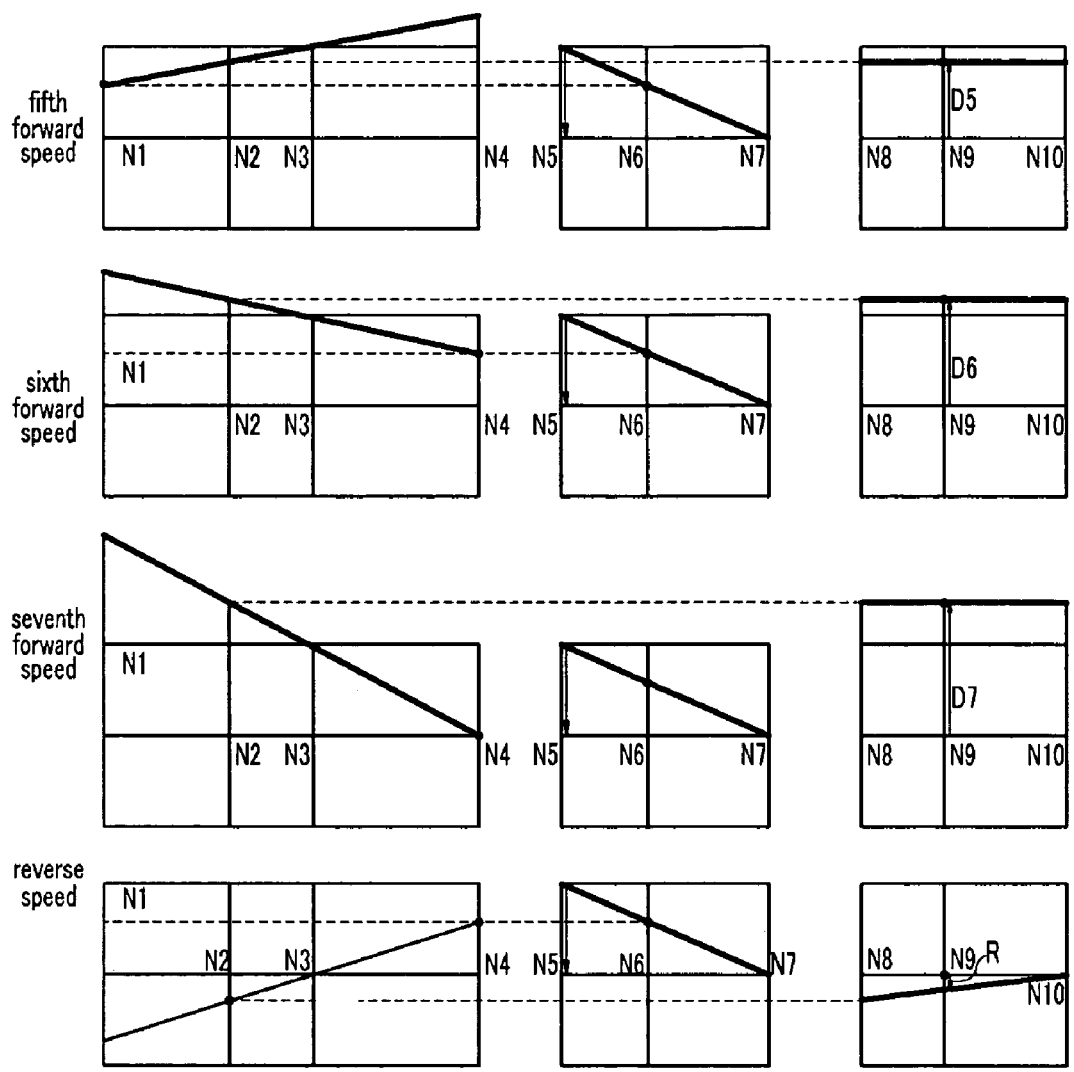
FIG. 4 is a speed diagram by lever analysis method for fifth through seventh forward speeds and a reverse speed of a powertrain according to the exemplary embodiment of the present invention.

Hereinafter, shift speeds achieved by the powertrain according to the embodiment of the present will be explained using a lever analysis method with reference to FIG. 3 and FIG. 4. In the primary shift portion A, no operational element is fixedly connected to other elements, so the primary shift portion A forms seven operational nodes. The third sun gear S3 is set as a first node N1, the second ring gear R2 is set as a second node N2, the second planet carrier PC2 is set as a third node N3, the second sun gear S2 is set as a fourth node N4, the first ring gear R1 is set as a fifth node N5, the first planet carrier PC1 is set as a sixth node N6, and the first sun gear S1 is set as a seventh node N7.

In the secondary shift portion B, no operational element is fixedly connected to other elements, so the secondary shift portion B forms three operational nodes. The third ring gear R3 is set as an eighth node N8, the third planet carrier PC3 is set as a ninth node N9, and the fourth sun gear S4 is set as a tenth node N10.

Since the primary shift portion A and the secondary shift portion B are connected via the transfer gear device C, i.e., via the transfer drive gear 7 and the transfer driven gear 9, a rotating direction of an input of the secondary shift portion B is opposite to that of an output of the primary shift portion A. However, for ease of explanation, in FIG. 3 and FIG. 4, the rotating direction of an input of the secondary shift portion B is shown to be the same with that. of an output of the primary shift portion A.

In order to achieve each shift speed in a powertrain according to an exemplary embodiment of the present invention, as described above, the frictional elements preferably operate as shown in FIG. 2. For example, for a first forward speed, the first clutch C1 and the first one-way clutch, OWC1 are operated in the primary shift portion A, and the second one-way clutch OWC2 is operated in the secondary shift portion B.

In the simple planetary gear set SPG1 of the primary shift portion A, the first sun gear S1 of the seventh node always acts as a fixed element, the first ring gear R1 always receives an input from the input shaft 1, and the first planet carrier PC1 always rotates at a reduced speed that is lower than a rotation speed of the first ring gear R1. In this state, the third sun gear S3 of the first node N1 is connected to the first planet carrier PC1 of the sixth node due to an operation of the first clutch C1 so as to allow power to be delivered therebetween, and the second planet carrier PC2 of the third node N3 acts as a reaction element due to an operation of the first one-way clutch OWC1. Therefore, an output at a reduced speed is generated through the second ring gear R2 of the second node N2.

The power at a reduced speed output from the primary shift portion A is input through the third ring gear R3 of the eighth node N8 of the secondary shift portion B, and the fourth sun gear S4 of the tenth node N10 acts as a reaction element due to an operation of the second one-way clutch OWC2. Accordingly, the ninth node N9 of an output element rotates at a speed of D1 shown in FIG. 3, and so the first forward speed is realized.

The second forward speed may be achieved by operating the first clutch C1, second brake B2, and the second one-way clutch OWC2. For example, the second forward speed may be achieved by releasing an operation of the first one-way clutch OWC1 and operating the second brake B2 from the state of the first forward speed.

Then, in the primary shift portion A, the second sun gear S2 of the fourth node N4 acts as a reaction element due to an operation of the second brake B2. Therefore, an output at a reduced speed higher than in the first forward speed is generated by the second ring gear R2 of the second node N2.

The power at a reduced speed output from the primary shift portion A is input through the third ring gear R3 of the eighth node N8 of the secondary shift portion B, and the fourth sun gear S4 of the tenth node N10 acts as a reaction element due to an operation of the second one-way clutch OWC2, as is in the first forward speed. Accordingly, the ninth node N9 of an output element rotates at a speed of D2, which is higher than that in the first forward speed, shown in FIG. 3, and so the second forward speed is realized.

The third forward speed may be achieved by operating the first clutch C1, the second clutch C2, and the second one-way clutch OWC2. For example, the third forward speed may be achieved by releasing an operation of the second brake B2 and operating the second clutch C2 from the state of the second forward speed.

Then, both of the third sun gear S3 of the first node N1 and the second sun gear S2 of the fourth node N4 are connected to the first planet carrier PC1 of the sixth node N6, and so the compound planetary gear set LPG is in a state of direct coupling so that all elements thereof rotate at the same speed. Therefore, an output at a reduced speed higher than in the second forward speed is generated by the second ring gear R2 of the second node N2.

The power at a reduced speed output from the primary shift portion A is input through the third ring gear R3 of the eighth node N8 of the secondary shift portion B, and the fourth sun gear S4 of the tenth node N10 acts as a reaction element due to an operation of the second one-way clutch OWC2, as is in the first and second forward speeds. Accordingly, the ninth node N9 of an output element rotates at a speed of D3, which is higher than that in the second forward speed, shown in FIG. 3, and so the third forward speed is realized.

The fourth forward speed may be achieved by operating the first clutch C1, the second clutch C2, and the fourth clutch C4. For example, the fourth forward speed may be achieved by releasing an operation of the second one-way clutch OWC2 and operating the fourth clutch C4 from the state of the third forward speed.

Then, the primary shift portion A generates an output in the same way of the third forward speed, and the secondary shift portion B is in direct coupling due to an operation of the fourth clutch C4. Accordingly, the ninth node N9 of an output element rotates at the same speed with the power output from the primary shift portion A, i.e., at the speed of D4 shown in FIG. 3, and so the fourth forward speed is realized.

The fifth forward speed may be achieved by operating the first clutch C1, the third clutch C3, and the fourth clutch C4. For example, the fifth forward speed may be achieved by releasing an operation of the second clutch C2 and operating the third clutch C3 from the state of the fourth forward speed.

Then, the third sun gear S3 of the first node N1 rotates at the same speed as the first planet carrier PC1 of the sixth node N6 due to an operation of the first clutch C1, and the second planet carrier PC2 of the third node N3 rotates at the same speed as the input shift 1 due to an operation of the third clutch C3. Therefore, an output at a reduced speed lower than in the first, second, third, and fourth forward speeds is generated through the second ring gear R2 of the second node N2.

The power at a higher speed than in the first, second, third, and fourth forward speeds output from the primary shift portion A is input into the third ring gear R3 of the eighth node N8 of the secondary shift portion B, and the secondary shift portion B is in direct coupling due to an operation of the fourth clutch C4. Accordingly, the ninth node N9 of an output element rotates at the same speed as the power output from the primary shift portion A, i.e., at the speed of D5 shown in FIG. 4, and so the fifth forward speed is realized.

The sixth forward speed may be achieved by operating the second clutch C2, the third clutch C3, and the fourth clutch C4. For example, the sixth forward speed may be achieved by releasing an operation of the first clutch C1 and operating the second clutch C2 from the state of the fifth forward speed.

Then, the second planet carrier PC2 of the third node N3 rotates at the same speed as the input shaft 1 due to an operation of the third clutch C3, and the second sun gear S2 of the fourth node N1 rotates at the same speed as the first planet carrier PC1 of the sixth node N6 due to an operation of the second clutch C2. Therefore, an output at an increased speed higher than an input speed is generated through the second ring gear R2 of the second node N2.

The secondary shift portion B is in direct coupling due to an operation of the fourth clutch C4 as is in the fourth and fifth forward speeds. Accordingly, the ninth node N9 of an output element rotates at the same speed as the power output from the primary shift portion A that is higher than a speed of the input shaft 1, i.e., at the speed of D6 shown in FIG. 4, and so the sixth forward speed is realized.

The seventh forward speed may be achieved by operating the third clutch C3, the second brake B2, and the fourth clutch C4. For example, the seventh forward speed may be achieved by releasing an operation of the second clutch C2 and operating the second brake B2 from the state of the sixth forward speed.

Then, the second planet carrier PC2 of the third node N3 rotates at the same speed as the input shaft 1 due to an operation of the third clutch C3, and the second sun gear S2 of the fourth node N4 acts as a reaction element due to an operation of the second brake B2. Therefore, an output at an increased speed higher than an input speed is generated through the second ring gear R2 of the second node N2.

In the seventh forward speed, since both of the first clutch C1 and the second clutch C2 do not operate, the simple planetary gear set and the compound planetary gear set are not connected to each other, so that they independently rotate.

The secondary shift portion B becomes in direct coupling due to an operation of the fourth clutch C4 as is in the fourth and fifth forward speeds. Accordingly, the ninth node N9 of an output element rotates at the same speed as the power output from the primary shift portion A that is higher than a speed of the input shaft 1, i.e., at the speed of D7 shown in FIG. 4, and so the seventh forward speed is realized.

For the reverse speed, only the second clutch C2 and the first brake B1 are operated in the primary shift portion A, and only the third brake B3 is operated in the secondary shift portion B. Then, the second sun gear S2 of the fourth node N4 is connected to the first planet carrier PC1 of the sixth node N6 due to an operation of the second clutch C2. The second planet carrier PC2 of the third node N3 acts as a reaction element due to an operation of the first brake B1. Therefore, a reverse output at a reduced speed is generated through the second ring gear R2 of the second node N2.

Then, the third ring gear R3 of the eighth node N8 receives a reverse power from the primary shift portion A, and the fourth sun gear S4 of the tenth node N10 acts as a reaction element due to an operation of the third brake B3. Accordingly, the ninth node N9 of an output element rotates at a speed of R shown in FIG. 4, and so the reverse speed is realized.

The speed changes in the primary and secondary shift portions A and B are as follows.

TABLE 1

| | | primary shift portion A | secondary shift portion B |
|---|---|---|---|
| Forward speed | 1 | reducing | reducing |
| | 2 | reducing | reducing |
| | 3 | reducing | reducing |
| | 4 | reducing (same as in the third forward speed) | same speed |
| | 5 | reducing | same speed |
| | 6 | Increasing (overdrive) | same speed |
| | 7 | Increasing (overdrive) | same speed |
| Reverse speed | | reducing in a reverse direction | reducing |

In addition, as shown in FIG. 2, a skip shift within three shift speed steps can be achieved by releasing one operational element and operating one operational element or by releasing two operational elements and operating two operational elements. Therefore, a shift performance of an automatic transmission can be improved.

In more detail, a third to first skip shift can be achieved by releasing an operation of the second clutch C2 and operating the first one-way clutch OWC1 from the state of the third forward speed. A sixth to fourth skip shift can be achieved by releasing an operation of the third clutch C3 and operating the first clutch C1 from the state of the sixth forward speed. A seventh to fifth skip shift can be achieved by releasing an operation of the second brake B2 and operating the first clutch C1 from the seventh forward speed. That is, these skip shifts can be achieved by releasing one operational element and operating one operational element.

A fourth to second skip shift can be achieved by releasing an operation of the fourth clutch C4 and operating the second one-way clutch OWC2 in the secondary shift portion B and by releasing an operation of the second clutch C2 and operating the second brake B2 in the primary shift portion A, from the state of the fourth forward speed. A fifth to third skip shift can be achieved by releasing an operation of the fourth clutch C4 and operating the second one-way clutch OWC2 in the secondary shift portion B and by releasing an operation of the third clutch C3 and operating the second clutch C2 in the primary shift portion A, from the state of the fifth forward speed. A fifth to second skip shift can be achieved by releasing an operation of the fourth clutch C4 and operating the second one-way clutch OWC2 in the secondary shift portion B and by releasing an operation of the third clutch C3 and operating the second brake B2 in the primary shift portion A, from the state of the fifth forward speed. A sixth to third skip shift can be achieved by releasing an operation of the fourth clutch C4 and operating the second one-way clutch OWC2 in the secondary shift portion B and by releasing an operation of the third clutch C3 and operating the first clutch C1 in the primary shift portion A, from the state of the sixth forward speed.

A seventh to fourth skip shift can be achieved by releasing operations of the third clutch C3 and the second brake B2 and operating the first and second clutches C1 and C2. That is, these skip shifts can be achieved by releasing two operational elements and operating two operational elements.

In an embodiment of the present invention, elements are separately disposed on two shafts, so that an overall length can be reduced. In addition, since the secondary shift portion integrally rotates at the fourth, fifth, sixth, and seventh forward speeds the secondary shift portion can share the load. Accordingly, durability of the planetary gear sets can be improved, and freedom in a selection of shift ratios can also be enhanced.

Further, since a skip shift within three shift speed steps is available, performance of the automatic transmission can be improved.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A seven-speed powertrain for an automatic transmission comprising:
   an input shaft;
   an output shaft disposed in parallel with the input shaft;
   a primary shift portion arranged on the input shaft so as to receive an input from the input shaft, and including a compound planetary gear set having a first, a second, a third, and a fourth operational element and a first simple planetary gear set having a fifth, a sixth, and a seventh operational element;
   a secondary shift portion arranged on the output shaft so as to transmit an output to the output shaft, and including a second simple planetary gear set having an eighth, a ninth, and a tenth operational element; and
   a transfer gear device connecting one of the operational elements of the primary shift portion and one of the operational elements of the secondary shift portion such that power from the primary shift portion can be transmitted to the secondary shift portion,
   wherein the first to the seventh operational elements of the primary shift portion are combined by three clutches, two brakes, and one one-way clutch, such that three operational elements of the first to the seventh operational elements act as variable input elements and two operational elements act as variable reaction elements; and
   the eighth to the tenth operational elements of the secondary shift portion are combined by one clutch, one brake, and one one-way clutch, such that one operational element of the eighth to the tenth operational elements acts as a variable reaction element and one operational element acts as an output element, and
   wherein the first simple planetary gear set of the primary shift portion is formed by a single pinion planetary gear set, and the compound planetary gear set of the primary shift portion is formed by a Ravingneaux type planetary gear set;
   the first simple planetary gear set comprises a first ring gear of the fifth operational element, a first planet carrier of the sixth operational element, and a first sun gear of the seventh operational element; and
   the compound planetary gear set comprises a second sun gear of the fourth operational element, a third sun gear of the first operational element, a second ring gear of the second operational element, and a second planet carrier of the third operational element.

2. The seven-speed powertrain of claim 1, wherein:
   the fifth operational element is fixedly connected to the input shaft so as to act as a fixed input element;
   the first and the fourth operational elements are variably connected to the sixth operational element respectively via a clutch so as to act as variable input elements;
   the third operational element is variably connected to the input shaft via a clutch so as to act as a variable input element;
   the fourth operational element is variably connected to a transmission case via a brake so as to also act as a variable reaction element;
   the third operational element is connected to the transmission case via a brake and a one-way clutch disposed in parallel so as to also act as a variable reaction element;
   the seventh operational element is fixedly connected to the transmission case so as to always act as a fixed element; and
   the second operational element is connected to the transfer gear device so as to act as an output element of the primary shift portion.

3. The seven-speed powertrain of claim 1, wherein:
   the second simple planetary gear set of the secondary shift portion is formed by a single pinion planetary gear set; and
   the second simple planetary gear set comprises a third ring gear of the eighth operational element, a third planet carrier of the ninth operational element, and a fourth sun gear of the tenth operational element.

4. The seven-speed powertrain of claim 3, wherein:
   the eighth operational element is connected to the transfer gear device so as to act as an input element of the secondary shift portion;

the ninth operational element acts as an output element and is connected to the tenth operational element via a clutch so as to be variably connected to the tenth operational element; and the tenth operational element is connected to the transmission case via a brake and a one-way clutch disposed in parallel so as to act as a variable reaction element.

5. The seven-speed powertrain of claim 1, wherein the transfer gear device comprises:

a transfer drive gear fixedly connected to the second operational element of the primary shift portion; and a transfer driven gear engaged with the transfer drive gear and fixedly connected to the eighth operational element of the secondary shift portion.

6. A seven-speed powertrain for an automatic transmission comprising:

an input shaft and an output shaft disposed in parallel with each other;

a primary shift portion arranged on the input shaft so as to receive an input from the input shaft;

a secondary shift portion arranged on the output shaft so as to transmit an output to the output shaft; and a transfer gear device connecting the primary shift portion and the secondary shift portion such that a power of the primary shift portion can be transmitted to the secondary shift portion, wherein:

the primary shift portion is formed by a combination of a simple planetary gear set and a compound planetary gear set, the simple planetary gear set being formed by a single pinion planetary gear set comprising a first sun gear, a first ring gear, and a first planet carrier as operational elements thereof, and the compound planetary gear set being formed by a Ravingneaux type planetary gear set comprising a second sun gear, a third sun gear, a second ring gear, and a second planet carrier as operational elements thereof;

the first sun gear of the simple planetary gear set is fixedly connected to a transmission case so as to always act as a fixed element;

the first ring gear is fixedly connected to the input shaft;

the third sun gear and the second sun gear of the compound planetary gear set are variably connected to the first planet carrier respectively via a first clutch and a second clutch;

the second planet carrier is variably connected to the input shaft via a third clutch and is also variably connected to the transmission case via a first brake;

the second sun gear is variably connected to the transmission case via a second brake; and the second ring gear is connected to the transfer gear device so as to transmit an output of the primary shift portion to the secondary shift portion, and wherein:

the secondary shift portion is formed by a simple planetary gear set formed by a single pinion planetary gear set comprising a fourth sun gear, a third ring gear, and a third planet carrier as operational elements thereof;

the third ring gear is connected to the transfer gear device so as to receive the output of the primary shift portion;

the third planet carrier acts as an output element of the secondary shift portion and is connected to the fourth sun gear via a fourth clutch so as to be variably connected to the fourth sun gear; and the fourth sun gear is variably connected to the transmission case via the third brake.

7. The seven-speed powertrain of claim 6, wherein a one-way clutch for preventing a reverse rotation is interposed between the second planet carrier and the transmission case.

8. The seven-speed powertrain of claim 6, wherein a one-way clutch for preventing a reverse rotation is interposed between the fourth sun gear and the transmission case.

9. The seven-speed powertrain of claim 6, wherein the transfer gear device comprises:

a transfer drive gear fixedly connected to the second ring gear of the primary shift portion; and a transfer driven gear engaged with the transfer drive gear and fixedly connected to the third ring gear of the secondary shift portion.

* * * * *